(12) United States Patent
Long et al.

(10) Patent No.: US 10,294,599 B2
(45) Date of Patent: May 21, 2019

(54) MOBILE DYEING CUP FOR SUPERCRITICAL FLUID DYEING AND FINISHING

(71) Applicants: NANTONG TEXTILE & SILK INDUSTRIAL TECHNOLOGY RESEARCH INSTITUTE, Nantong, Jiangsu (CN); SOOCHOW UNIVERSITY, Suzhou (CN); SIYANG ZHONGLIAN TEXTILE TECHNOLOGY CO., LTD., Siyang, Jiangsu (CN)

(72) Inventors: Jiajie Long, Suzhou (CN); Jianzhong Guo, Suzhou (CN)

(73) Assignees: NANTONG TEXTILE & SILK INDUSTRIAL TECHNOLOGY RESEARCH INSTITUTE, Nantong (CN); SOOCHOW UNIVERSITY, Suzhou (CN); SIYANG ZHONGLIAN TEXTILE TECHNOLOGY CO., LTD., Siyang (CN)

( * ) Notice: Subject to any disclaimer, the term of this patent is extended or adjusted under 35 U.S.C. 154(b) by 12 days.

(21) Appl. No.: 15/556,681

(22) PCT Filed: Jun. 6, 2016

(86) PCT No.: PCT/CN2016/084896
§ 371 (c)(1),
(2) Date: Sep. 8, 2017

(87) PCT Pub. No.: WO2017/201768
PCT Pub. Date: Nov. 30, 2017

(65) Prior Publication Data
US 2018/0094374 A1    Apr. 5, 2018

(30) Foreign Application Priority Data

May 27, 2016   (CN) .......................... 2016 1 0363185

(51) Int. Cl.
*D06B 23/10*   (2006.01)
*D06B 9/02*   (2006.01)
(Continued)

(52) U.S. Cl.
CPC ............... *D06B 23/10* (2013.01); *D06B 9/02* (2013.01); *D06B 19/00* (2013.01); *D06B 23/14* (2013.01);
(Continued)

(58) Field of Classification Search
CPC ........ D06B 23/10; D06B 23/14; D06B 23/18; D06B 23/20; D06P 1/94
See application file for complete search history.

(56) References Cited

U.S. PATENT DOCUMENTS

| 3,165,910 | A | * | 1/1965 | Thies ....................... D06B 5/00 |
| | | | | 68/13 R |
| 3,230,745 | A | * | 1/1966 | Bittle ................. D01D 10/0481 |
| | | | | D10/481 |

(Continued)

FOREIGN PATENT DOCUMENTS

| CN | 1944762 A | 4/2007 |
| CN | 101024922 A | 8/2007 |

(Continued)

OTHER PUBLICATIONS

Machine translation of CN 201033838 Y. (Year: 2008).*

*Primary Examiner* — Joseph L. Perrin
(74) *Attorney, Agent, or Firm* — SZDC Law P.C.

(57) ABSTRACT

The invention discloses a mobile dyeing cup for supercritical fluid waterless dyeing and finishing. The dyeing cup achieves separate or simultaneous filling of the medium into multiple dyeing units, and simultaneous heating of the dyeing units for proofing processing. A medium outlet is provided at the lowest position of the bottom of the cup, and (Continued)

the inner surface of the dyeing cup is coated with polytetrafluoroethylene, to effectively reduce residual dye chemicals in the cup and improve the cleaning efficiency. The perforated baffle at the bottom of the cup effectively prevents a textile product from blocking the medium outlet during medium filling and outputting, so that the processing medium and residual dye chemicals can be smoothly discharged. Accordingly, defects of an existing fixed proofing device such as low utilization efficiency, complex cleaning and incapability of meeting the proofing requirements of commercial production are overcome.

4 Claims, 4 Drawing Sheets

(51) Int. Cl.
    *D06B 23/14*     (2006.01)
    *D06B 19/00*     (2006.01)
    *D06B 23/20*     (2006.01)

(52) U.S. Cl.
    CPC ............ *D06B 23/20* (2013.01); *D06B 23/205* (2013.01); *Y02P 70/643* (2015.11)

(56) References Cited

U.S. PATENT DOCUMENTS

| | | | | |
|---|---|---|---|---|
| 3,255,916 A * | 6/1966 | Rice | .................. | D06B 23/18 |
| | | | | 220/304 |
| 3,871,821 A * | 3/1975 | Winn | .................. | D06B 9/02 |
| | | | | 8/149.1 |
| 5,953,780 A * | 9/1999 | Schollmeyer | ............ | D06B 5/12 |
| | | | | 8/158 |
| 5,958,085 A * | 9/1999 | Eggers | ................ | D06B 23/205 |
| | | | | 8/149.2 |
| 2002/0108183 A1* | 8/2002 | Smith | .................. | D06B 19/00 |
| | | | | 8/115.51 |
| 2005/0257572 A1* | 11/2005 | Van Schepdael | ...... | D06B 23/14 |
| | | | | 68/3 R |
| 2016/0194825 A1* | 7/2016 | Long | .................. | D06P 5/02 |
| | | | | 8/115.69 |
| 2016/0244902 A1* | 8/2016 | Tsai | .................. | D06B 23/042 |

FOREIGN PATENT DOCUMENTS

| | | | | |
|---|---|---|---|---|
| CN | 201033838 Y | * | 3/2008 | |
| CN | 101413191 A | | 4/2009 | |
| CN | 102535068 A | | 7/2012 | |
| CN | 103422288 A | | 12/2013 | |
| CN | 205775262 U | | 12/2016 | |
| WO | WO-2015032022 A1 | * | 3/2015 | ............ D06P 5/02 |

* cited by examiner

MOBILE DYEING CUP FOR SUPERCRITICAL FLUID DYEING AND FINISHING

This application is a national stage application of PCT/CN2016/084896, filed on Jun. 6, 2016, which claims the priority from Chinese Patent Application Ser. No. 201610363185.1, filed on May 27, 2016, and entitled "mobile dyeing cup for supercritical fluid waterless dyeing and finishing," all of which are incorporated herein by reference in their entirety.

FIELD OF THE INVENTION

The present invention relates to the field of manufacturing technologies of a pressure vessel and a textile dyeing and finishing facility, and more particular to a mobile dyeing cup for supercritical fluid waterless dyeing and finishing.

DESCRIPTION OF THE RELATED ART

A fluid medium such as supercritical $CO_2$ can replace the conventional water bath to perform dyeing and finishing on textiles, so that the problems such as high energy consumption and severe environmental pollution caused by the conventional water bath processing can be thoroughly solved fundamentally. Therefore, development of waterless equipment systems represented by the supercritical $CO_2$ fluid is of great realistic and strategic significance for sustainable development of the textile printing and dyeing industry, protection of ecological environment, and so on.

In the printing and dyeing processing and production of textiles, small-scale proofing is the prerequisite for obtaining the basic formula of the production and processing, and plays an essential role, especially in color processing and production of textiles. Therefore, to develop an efficient, reliable, and applicable proofing equipment system for small-scale proofing is extremely important for application, promotion as well as industrialization of the supercritical fluid waterless dyeing and finishing technology.

According to the currently available literature report and practical application, in the conventional supercritical fluid dyeing proofing device, generally one system is provided with one fixed proofing processing unit and equipped with one corresponding pressurization device or system, and a separation and recycling system is provided downstream of the proofing unit, to separate and recycle a dyeing medium when the process is finished. However, the biggest disadvantage of such a processing system is that generally, dyeing proofing processing can be performed on only one sample at a time. Moreover, after each proofing is finished, the proofing unit must be cleaned before the next proofing test. In particular, in the dyeing proofing test, and especially when the color for proofing needs to be changed, it becomes very important to clean the system thoroughly. However, most existing device systems or proofing processing units thereof have a complex cleaning procedure and cannot be cleaned easily. In addition, pressurization and separation and recycling systems provided for such existing dyeing proofing systems have a very high vacancy rate, and cannot be fully used effectively. So, these existing proofing systems have extremely low efficiency and are far from meeting the proofing requirements of commercial production. Therefore, this also greatly affects and hinders the industrial application and promotion of the supercritical fluid waterless dyeing and finishing technology.

SUMMARY OF THE INVENTION

In order to solve the above technical problems, one object of the present invention is to provide a mobile dyeing cup for supercritical fluid waterless dyeing and finishing, which has high proofing efficiency, simple operation, reliability, high cleaning efficiency, is economical and practical and thus has a wide application range.

For the above purposes, the invention provides a mobile dyeing cup for supercritical fluid waterless dyeing and finishing, the mobile dyeing cup comprises a high-pressure dyeing cup body, a high-pressure dyeing cup seal cover, a first high-pressure pipe, a second high-pressure pipe, a first high-pressure stop valve and a second high-pressure stop valve.

The high-pressure dyeing cup seal cover movably covers an upper cup opening of the high-pressure dyeing cup body. One end of the first high-pressure pipe is connected with an upper end of the high-pressure dyeing cup seal cover and is in communication with the high-pressure dyeing cup body, and the other end of the first high-pressure pipe is connected to an external gas source or filling system. The first high-pressure stop valve is mounted on the first high-pressure pipe;

The bottom of the high-pressure dyeing cup body is in the shape of a circular arc, and a medium outlet is provided at the lowest portion of the circular arc bottom of the high-pressure dyeing cup body. One end of the second high-pressure pipe is connected at the medium outlet, and the other end of the second high-pressure pipe is connected to an external separation and recycling system. The second high-pressure stop valve is mounted on the second high-pressure pipe.

A perforated baffle is fixedly disposed in the high-pressure dyeing cup body, and the perforated baffle is located on a chord of the circular arc bottom of the high-pressure dyeing cup body.

The mobile dyeing cup for supercritical fluid waterless dyeing and finishing further comprises a wireless integrated pressure and temperature sensor and a safety valve. The wireless integrated pressure and temperature sensor is mounted on the first high-pressure pipe or the second high-pressure pipe, and the safety valve is also mounted on the first high-pressure pipe or the second high-pressure pipe.

Preferably, both the wireless integrated pressure and temperature sensor and the safety valve are mounted on the second high-pressure pipe. A four-way connector is mounted on the second high-pressure pipe between the medium outlet and the second high-pressure stop valve, and the wireless integrated pressure and temperature sensor and the safety valve is mounted at two opposite joints of the four-way connector respectively.

Preferably, both the wireless integrated pressure and temperature sensor and the safety valve are mounted on the first high-pressure pipe. A four-way connector is mounted on the first high-pressure pipe between the high-pressure dyeing cup seal cover and the first high-pressure stop valve, and the wireless integrated pressure and temperature sensor and the safety valve are mounted at two opposite joints of the four-way connector respectively.

Preferably, the wireless integrated pressure and temperature sensor is mounted on the first high-pressure pipe and the safety valve is mounted on the second high-pressure pipe. A first three-way connector is mounted on the first high-pressure pipe between the high-pressure dyeing cup seal cover and the first high-pressure stop valve, and the wireless integrated pressure and temperature sensor is mounted at a middle joint of the first three-way connector. A second three-way connector is mounted on the second high-pressure pipe between the medium outlet and the second high-pressure stop valve, and the safety valve is mounted at a middle joint of the second three-way connector.

Preferably, the wireless integrated pressure and temperature sensor is mounted on the second high-pressure pipe and the safety valve is mounted on the first high-pressure pipe. A first three-way connector is mounted on the first high-pressure pipe between the high-pressure dyeing cup seal cover and the first high-pressure stop valve, and the safety valve is mounted at a middle joint of the first three-way connector. A second three-way connector is mounted on the second high-pressure pipe between the medium outlet and the second high-pressure stop valve, and the wireless integrated pressure and temperature sensor is mounted at a middle joint of the second three-way connector.

Preferably, the perforated baffle is made of fluorine coated stainless steel or a tetrafluoride material, and the perforated baffle has a pore size of 0.01 to 2 cm.

Preferably, an inner surface of the high-pressure dyeing cup body is coated with polytetrafluoroethylene.

By means of the above technical solution, as compared with the prior art, the present invention has the following advantages: in the present invention, the high-pressure dyeing cup can be connected to a supercritical fluid boosting and filling system as well as separation and recycling system, to achieve filling of a processing medium and separation and recycling of the medium after the filling is finished; and also, the high-pressure dyeing cup can be disconnected from the foregoing systems, such that a conventional fixed supercritical fluid dyeing proofing unit is designed into a mobile dyeing cup, and achieving separate or simultaneous filling of the medium into multiple dyeing units (dyeing cups), and simultaneous heating of the dyeing units for proofing processing. In this way, efficiency of proofing processing such as high-pressure supercritical fluid waterless dyeing and thus the utilization rate of the medium boosting and filling system as well as separation and recycling system are significantly improved, so that the proofing requirements of commercial production of textile waterless dyeing and finishing are met. Furthermore, the wireless integrated pressure and temperature sensor disposed on the dyeing cup can transmit the pressure and temperature of the medium in the dyeing cup to an external receiving system in real time, thereby achieving recording and real-time monitoring of the pressure and temperature of the medium in the dyeing cup. The safety valve disposed on the dyeing cup can effectively ensure the safe use of the dyeing cup under a high pressure condition. More importantly, in the present invention, the medium outlet of the high-pressure dyeing cup is provided at the lowest point of the circular arc bottom of the cup, and the whole inner surface of the dyeing cup is coated with polytetrafluoroethylene, so that residual dye chemicals at the dead corners of the cup and dye chemicals adhered on the inner wall of the cup can be effectively reduced, thus greatly improving the cleaning efficiency. The perforated baffle provided on the chord of the circular arc bottom of the cup effectively prevents a textile product in the cup from blocking the medium outlet at the bottom of the dyeing cup during medium filling and outputting, so that the processing medium and residual dye chemicals thereof can be smoothly discharged via the medium outlet. Accordingly, defects of an existing fixed supercritical fluid dyeing proofing device or an equipment system thereof, such as low utilization efficiency, complex cleaning, and incapability of meeting the proofing requirements of commercial production, are overcome. Therefore, the present invention can significantly improve the proofing efficiency of supercritical fluid waterless dyeing and finishing, and has advantages such as a high utilization rate of the equipment system, simple operation, reliability, high cleaning efficiency, being economical and practical, as well as a wide application range. The present invention has a broad application prospect and practical significance in fundamentally addressing generation and emission of pollutants in the textile printing and dyeing industry and realizing environmentally friendly clean production of the textile printing and dyeing industry.

Figure 1:
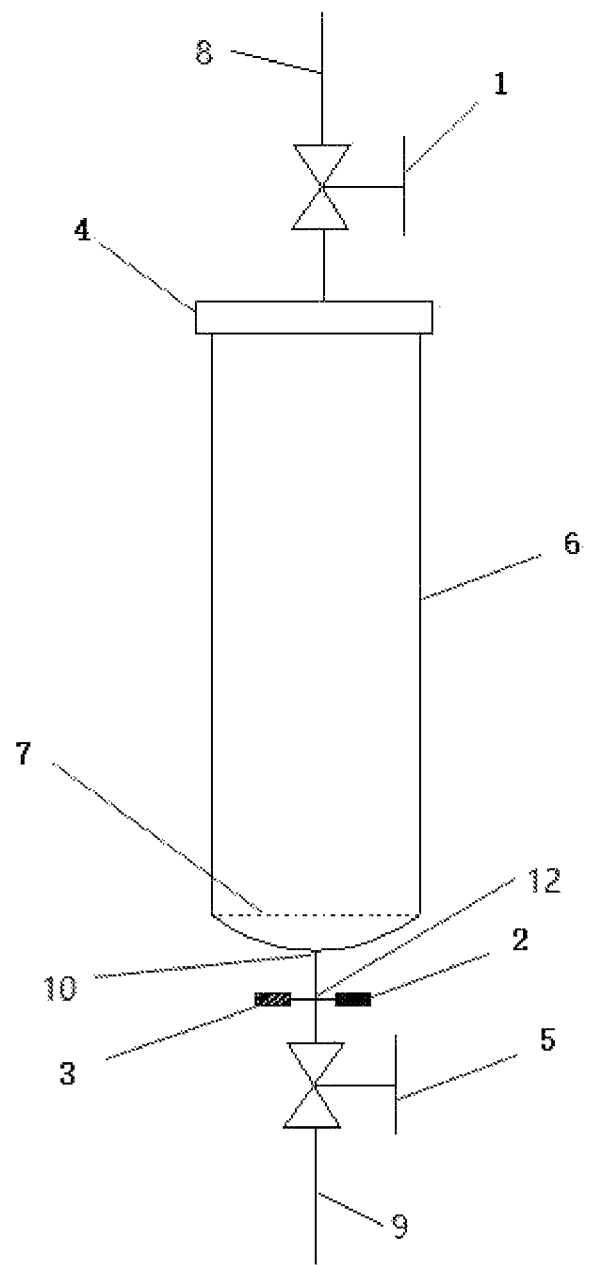
FIG. 1 is a schematic view of a mobile dyeing cup for supercritical fluid waterless dyeing and finishing according to embodiment 1 of the present invention.

In the drawings, 1. first high-pressure stop valve; 2. wireless integrated pressure and temperature sensor; 3. safety valve; 4. high-pressure dyeing cup seal cover; 5. second high-pressure stop valve; 6. high-pressure dyeing cup body; 7. perforated baffle; 8. first high-pressure pipe; 9. second high-pressure pipe; 10. medium outlet; 12. four-way connector; 13. first three-way connector; and 14. second three-way connector.

DETAILED DESCRIPTION OF THE PREFERRED EMBODIMENTS

The invention will be further illustrated in more detail with reference to the accompanying drawings and embodiments. It is noted that, the following embodiments only are intended for purposes of illustration, but are not intended to limit the scope of the present invention.

Embodiment 1

As shown in FIG. 1, a mobile dyeing cup for supercritical fluid waterless dyeing and finishing includes a high-pressure dyeing cup body 6, a high-pressure dyeing cup seal cover 4, a first high-pressure pipe 8, a second high-pressure pipe 9, a first high-pressure stop valve 1 and a second high-pressure stop valve 5. The high-pressure dyeing cup seal cover movably covers the upper cup opening of the high-pressure dyeing cup body. One end of the first high-pressure pipe is connected with the upper end of the high-pressure dyeing cup seal cover and is in communication with the high-pressure dyeing cup body, and the other end of the first high-pressure pipe is connected to an external gas source or filling system. The first high-pressure stop valve is mounted on the first high-pressure pipe.

The first high-pressure stop valve can achieve the filling of a medium into the dyeing cup, and the separation and disconnection of the dyeing cup from the gas source or filling system. The movable high-pressure dyeing cup seal cover achieves the high-pressure sealing for the medium in the cup.

The bottom of the high-pressure dyeing cup body is in the shape of a circular arc. A medium outlet 10 is provided at the lowest position of the circular arc bottom of the high-pressure dyeing cup body. One end of the second high-pressure pipe is connected at the medium outlet, and the other end of the second high-pressure pipe is connected to an external separation and recycling system. The second high-pressure stop valve is mounted on the second high-pressure pipe.

The second high-pressure stop valve can achieve the pressure relief and output of the medium in the dyeing cup, and the separation and disconnection of the dyeing cup from the separation and recycling system.

A perforated baffle 7 is fixedly disposed in the high-pressure dyeing cup body, and the perforated baffle is located on a chord of the circular arc bottom of the high-pressure dyeing cup body.

The perforated baffle can effectively prevent a textile product in the cup from blocking the medium outlet at the bottom of the dyeing cup, and enable the processing medium to pass smoothly and then to be discharged via the medium outlet.

The mobile dyeing cup for supercritical fluid waterless dyeing and finishing further includes a wireless integrated pressure and temperature sensor 2 and a safety valve 3. Both the wireless integrated pressure and temperature sensor and the safety valve are mounted on the second high-pressure pipe. A four-way connector 12 is mounted on the second high-pressure pipe. The four-way connector is located between the medium outlet and the second high-pressure stop valve. The wireless integrated pressure and temperature sensor and the safety valve are mounted at two opposite joints of the four-way connector respectively.

The wireless integrated pressure and temperature sensor can achieve remote transmission of the pressure of the medium in the dyeing cup, and the safety valve can achieve the emergency pressure relief when the pressure in the cup exceeds a safety pressure.

The perforated baffle is made of fluorine coated stainless steel or a tetrafluoride material, and the perforated baffle has a pore size of 0.01 to 2 cm.

The inner surface of the high-pressure dyeing cup body is coated with polytetrafluoroethylene.

Certainly, the mounting positions of the wireless integrated pressure and temperature sensor and the safety valve are not limited to the positions described in this embodiment 1, and may also be other positions. Some of the other mounting positions of the wireless integrated pressure and temperature sensor and the safety valve are provided in the following embodiments.

Embodiment 2

Figure 2:
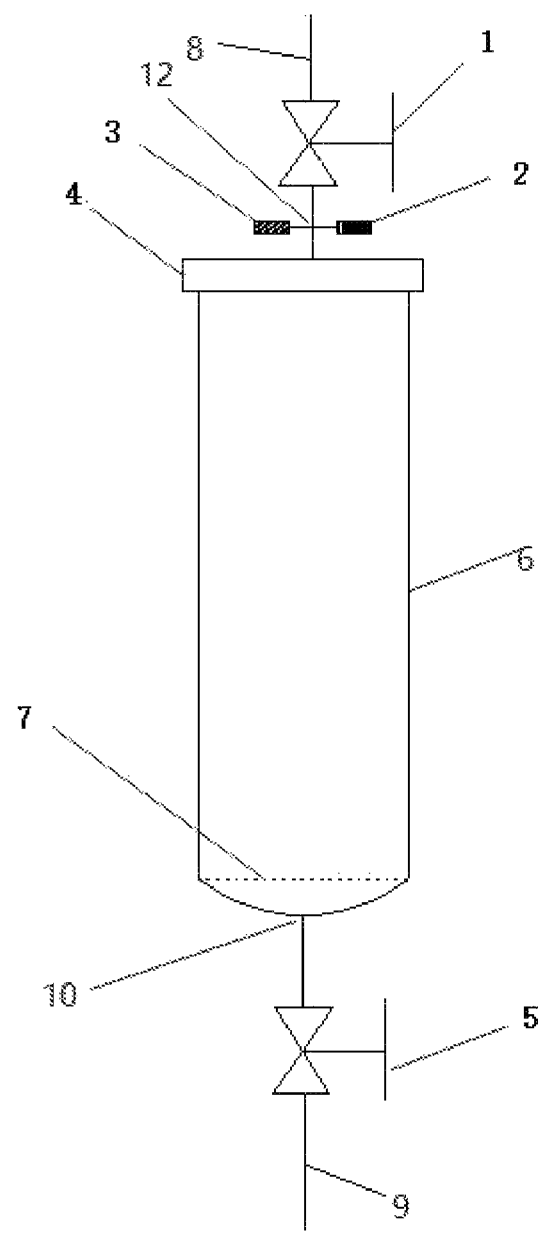
FIG. 2 is a schematic view of a mobile dyeing cup for supercritical fluid waterless dyeing and finishing according to embodiment 2 of the present invention.

As shown in FIG. 2, both the wireless integrated pressure and temperature sensor and the safety valve are mounted on the first high-pressure pipe. A four-way connector 12 is mounted on the first high-pressure pipe. The four-way connector is located between the high-pressure dyeing cup seal cover and the first high-pressure stop valve, and the wireless integrated pressure and temperature sensor and the safety valve are mounted at two opposite joints of the four-way connector respectively.

Embodiment 3

Figure 3:
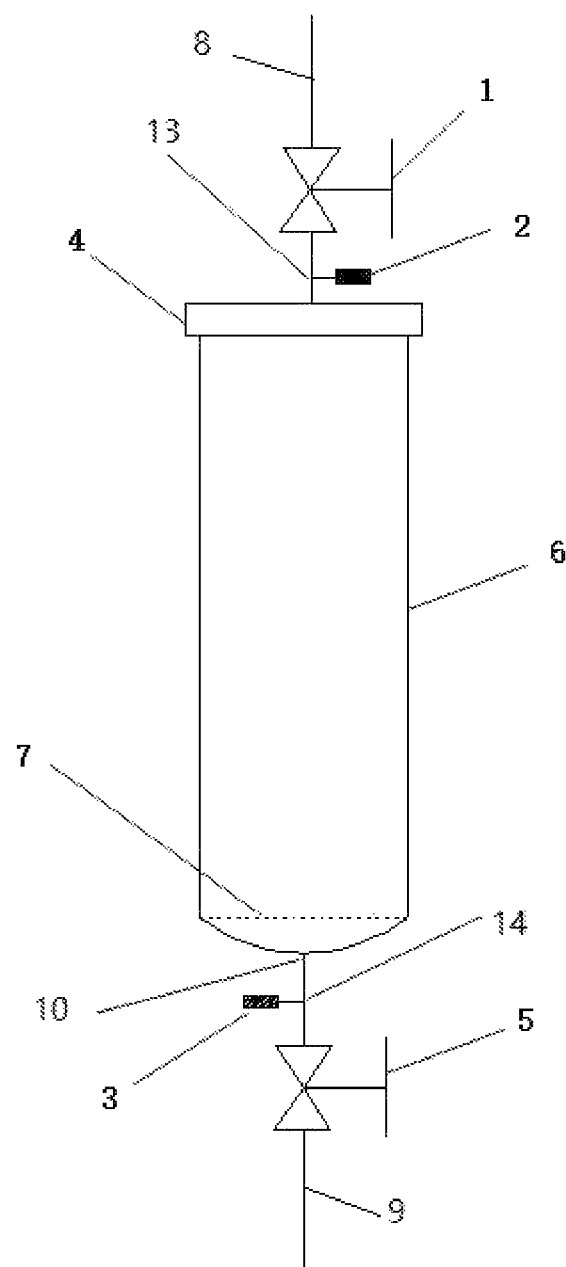
FIG. 3 is a schematic view of a mobile dyeing cup for supercritical fluid waterless dyeing and finishing according to embodiment 3 of the present invention.

As shown in FIG. 3, the wireless integrated pressure and temperature sensor is mounted on the first high-pressure pipe, and the safety valve is mounted on the second high-pressure pipe. A first three-way connector 13 is mounted on the first high-pressure pipe. The first three-way connector is located between the high-pressure dyeing cup seal cover and the first high-pressure stop valve. The wireless integrated pressure and temperature sensor is mounted at a middle joint of the first three-way connector. A second three-way connector 14 is mounted on the second high-pressure pipe. The second three-way connector is located between the medium outlet and the second high-pressure stop valve, and the safety valve is mounted at a middle joint of the second three-way connector.

Embodiment 4

Figure 4:
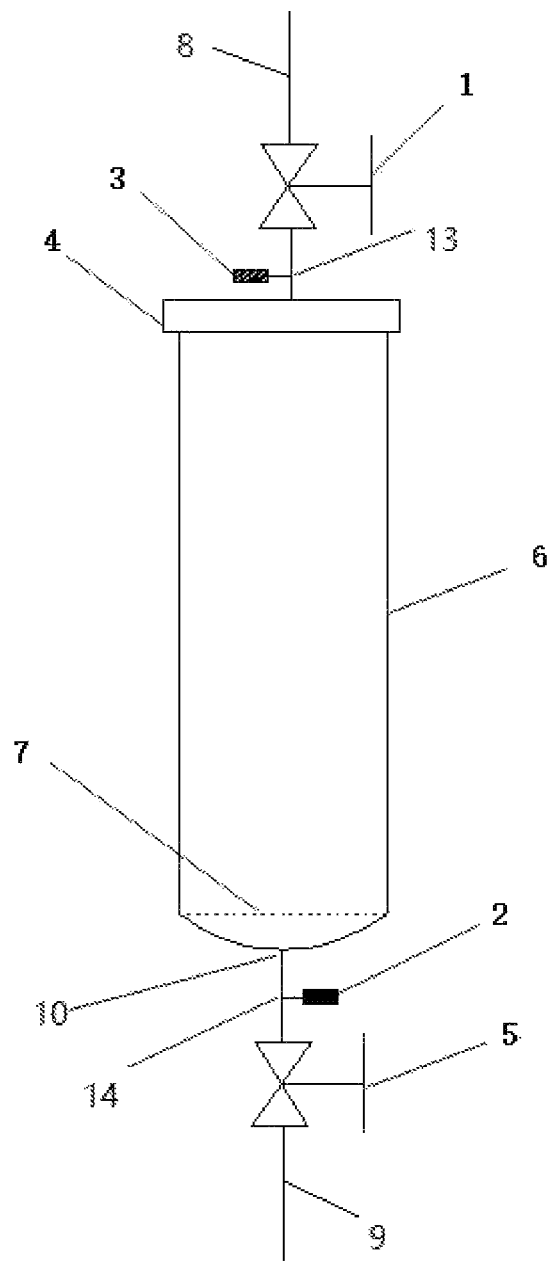
FIG. 4 is a schematic view of a mobile dyeing cup for supercritical fluid waterless dyeing and finishing according to embodiment 4 of the present invention.

As shown in FIG. 4, the wireless integrated pressure and temperature sensor is mounted on the second high-pressure pipe and the safety valve is mounted on the first high-pressure pipe. A first three-way connector 13 is mounted on the first high-pressure pipe. The first three-way connector is located between the high-pressure dyeing cup seal cover and the first high-pressure stop valve. The safety valve is mounted at a middle joint of the first three-way connector. A second three-way connector 14 is mounted on the second high-pressure pipe. The second three-way connector is located between the medium outlet and the second high-pressure stop valve, and the wireless integrated pressure and temperature sensor is mounted at a middle joint of the second three-way connector.

When the mobile dyeing cup for supercritical fluid waterless dyeing and finishing of the present invention operates, firstly, the second high-pressure stop valve 5 is closed, and quantitative textile products on which proofing treatment needs to be performed and quantitative dye chemicals are placed in the high-pressure dyeing cup body 6. The high-pressure dyeing cup seal cover 4 is used to seal the high-pressure dyeing cup body, and other components are connected and assembled correspondingly. Then, the first high-pressure pipe connected to the first high-pressure stop valve 1 is communicated with the gas source of the processing medium or the medium filling system, and the first high-pressure stop valve 1 is opened to perform quantitative medium filling on the dyeing cup system. After the filling is finished, the first high-pressure stop valve 1 is closed, and the dyeing cup system is separated from the filling system. The above operations are repeated, to fill the medium into a series of dyeing cups on which proofing treatment needs to be performed. Subsequently, the prepared dyeing cups to be heated for proofing are together placed in a heating system or other heating baths, and proofing treatment is performed in a centralized manner according to a predetermined heating program and proofing conditions.

After the proofing is finished, the dyeing cups may be separately or simultaneously communicated with a dedicated separation and recycling system through the second high-pressure pipe at the lower end of the second high-pressure stop valve 5, to separate and recycle the processing medium and residual dye chemicals in the cups. Furthermore, according to the actual requirements such as dyeing proofing, especially dark color proofing, the dyeing cup system may also be communicated with the gas source of the processing medium or the medium filling system through the first high-pressure pipe connected with the first high-pressure stop valve 1. Unfixed dye or other residual dye chemicals on a sample in the dyeing cup and residual dye chemicals in the cup are cleaned by using the clean fluid medium. The medium for cleaning flows through the perforated baffle 7 and the medium outlet 10 provided at the bottom of the high-pressure dyeing cup body 6, and is then separated and recycled by the separation and recycling system.

After the separation and recycling and/or cleaning is finished, first, the first high-pressure stop valve 1 disposed on each dyeing cup needs to be closed, and then, a gas pump provided for the separation and recycling system is used to fully recycle and reduce the pressure of the medium in each dyeing cup. When a pressure displayed by the wireless integrated pressure and temperature sensor 2 is equal to or less than the atmospheric pressure, the gas pump of the separation and recycling system is stopped. Then, the dedicated gas source of the processing medium or the medium filling system and the separation and recycling system connected to the dyeing cup are respectively disconnected and separated, the high-pressure dyeing cup seal cover 4 is opened, and the sample is taken out, to accomplish the sample proofing of waterless dyeing and finishing. By repeating the above operations, the next sample proofing of supercritical fluid waterless dyeing and finishing can be implemented continuously.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A mobile dyeing cup for supercritical fluid waterless dyeing and finishing, comprising a high-pressure dyeing cup body (6), a high-pressure dyeing cup seal cover (4), a first high-pressure pipe (8), a second high-pressure pipe (9), a first high-pressure stop valve (1) and a second high-pressure stop valve (5), wherein:

the high-pressure dyeing cup seal cover movably covers an upper cup opening of the high-pressure dyeing cup body, one end of the first high-pressure pipe being connected with an upper end of the high-pressure dyeing cup seal cover and being in communication with the high-pressure dyeing cup body, the other end of the first high-pressure pipe being connected to an external gas source or filling system, and the first high-pressure stop valve being mounted on the first high-pressure pipe;

the bottom of the high-pressure dyeing cup body is in the shape of a circular arc, a medium outlet (10) being provided at the lowest portion of the circular arc bottom of the high-pressure dyeing cup body, one end of the second high-pressure pipe being connected at the medium outlet, the other end of the second high-pressure pipe being connected to an external separation and recycling system, and the second high-pressure stop valve being mounted on the second high-pressure pipe;

a perforated baffle (7) is fixedly disposed in the high-pressure dyeing cup body, and the perforated baffle being located on a chord of the circular arc bottom of the high-pressure dyeing cup body;

the mobile dyeing cup for supercritical fluid waterless dyeing and finishing further comprises a wireless integrated pressure and temperature sensor (2) and a safety valve (3), the wireless integrated pressure and temperature sensor being mounted on the first high-pressure pipe or the second high-pressure pipe, and the safety valve being mounted on the first high-pressure pipe or the second high-pressure pipe;

both the wireless integrated pressure and temperature sensor and the safety valve are mounted on the second high-pressure pipe, a four-way connector (12) being mounted on the second high-pressure pipe between the medium outlet and the second high-pressure stop valve, and the wireless integrated pressure and temperature sensor and the safety valve being mounted at two opposite joints of the four-way connector respectively;

the perforated baffle is made of fluorine coated stainless steel or a tetrafluoride material, and the perforated baffle has a pore size of 0.01 to 2 cm; and an inner surface of the high-pressure dyeing cup body is coated with polytetrafluoroethylene.

2. The mobile dyeing cup for supercritical fluid waterless dyeing and finishing as claimed in claim 1, wherein both the wireless integrated pressure and temperature sensor and the safety valve are mounted on the first high-pressure pipe, a four-way connector (12) being mounted on the first high-pressure pipe between the high-pressure dyeing cup seal cover and the first high-pressure stop valve, and the wireless integrated pressure and temperature sensor and the safety valve being mounted at two opposite joints of the four-way connector respectively.

3. The mobile dyeing cup for supercritical fluid waterless dyeing and finishing as claimed in claim 1, wherein the wireless integrated pressure and temperature sensor is mounted on the first high-pressure pipe and the safety valve is mounted on the second high-pressure pipe, a first three-way connector (13) being mounted on the first high-pressure pipe, between the high-pressure dyeing cup seal cover and the first high-pressure stop valve, the wireless integrated pressure and temperature sensor being mounted at a middle joint of the first three-way connector, a second three-way connector (14) being mounted on the second high-pressure pipe between the medium outlet and the second high-pressure stop valve, and the safety valve being mounted at a middle joint of the second three-way connector.

4. The mobile dyeing cup for supercritical fluid waterless dyeing and finishing as claimed in claim 1, wherein the wireless integrated pressure and temperature sensor is mounted on the second high-pressure pipe and the safety valve is mounted on the first high-pressure pipe, a first three-way connector (13) being mounted on the first high-pressure pipe between the high-pressure dyeing cup seal cover and the first high-pressure stop valve, the safety valve being mounted at a middle joint of the first three-way connector, a second three-way connector (14) being mounted on the second high-pressure pipe between the medium outlet and the second high-pressure stop valve, and the wireless integrated pressure and temperature sensor being mounted at a middle joint of the second three-way connector.

* * * * *